United States Patent
Cho et al.

(10) Patent No.: US 8,399,787 B2
(45) Date of Patent: Mar. 19, 2013

(54) SWITCH LEVER FOR VEHICLE

(75) Inventors: Eun Seong Cho, Ansan-si (KR); Je Hun Oh, Ansan-si (KR)

(73) Assignee: Shingchang Electric Co., Ltd., Ansan-Si, Kyunggi-Do (KR)

( * ) Notice: Subject to any disclaimer, the term of this patent is extended or adjusted under 35 U.S.C. 154(b) by 359 days.

(21) Appl. No.: 12/746,243

(22) PCT Filed: Dec. 5, 2008

(86) PCT No.: PCT/KR2008/007225
§ 371 (c)(1),
(2), (4) Date: Jul. 13, 2010

(87) PCT Pub. No.: WO2009/072844
PCT Pub. Date: Jun. 11, 2009

(65) Prior Publication Data
US 2010/0276263 A1   Nov. 4, 2010

(30) Foreign Application Priority Data
Dec. 5, 2007 (KR) .......................... 10-2007-0125663

(51) Int. Cl.
*H01H 9/00* (2006.01)
(52) U.S. Cl. .................................... 200/61.54
(58) Field of Classification Search ............... 200/61.39, 200/61.27, 61.54
See application file for complete search history.

(56) References Cited

U.S. PATENT DOCUMENTS

| | | | |
|---|---|---|---|
| 4,387,279 A * | 6/1983 | Brevick | ...................... 200/61.54 |
| 5,859,396 A | 1/1999 | Yokoyama | |
| 6,260,431 B1 | 7/2001 | Yokoyama | |

FOREIGN PATENT DOCUMENTS

| | | |
|---|---|---|
| JP | 10-241507 A | 9/1998 |
| JP | 2000-057906 A | 2/2000 |
| JP | 2003-092046 A | 3/2003 |
| KR | 10-1998-0024019 | 7/1998 |

* cited by examiner

*Primary Examiner* — Vanessa Girardi
(74) *Attorney, Agent, or Firm* — Sherr & Jiang, PLLC

(57) ABSTRACT

A switch lever for a vehicle including: knobs that perform a rotation manipulation in order to turn on, turn on or off a light of a vehicle, or to adjust a wiping interval of a windshield wiper of the vehicle; a pair of lever arms that are disposed within and rotate with the knobs according to a rotation of the knobs; a pair of contact terminals each that is installed at an end part of one side of the lever arms to move according to a rotation of the lever arms; a guide member having guide grooves for receiving the pair of contact terminals therein; and an insulation part having a fixed terminal that contacts with each of the contact terminals to generate an operation signal.

9 Claims, 5 Drawing Sheets

SWITCH LEVER FOR VEHICLE

CROSS REFERENCE TO PRIOR APPLICATIONS

This application is a National Stage Patent Application of International Patent Application No. PCT/KR2008/007225 (filed on Dec. 5, 2008) under 35 U.S.C. 371, which claims priority to Korean Patent Application No. 10-2007-0125663 (filed on Dec. 5, 2007), which are both hereby incorporated by reference in their entirety.

TECHNICAL FIELD

The present invention relates to a switch lever for a vehicle, and more particularly, to a switch lever for a vehicle for transferring an operation signal of each knob to a control unit of a corresponding device by two or more level arms disposed to be overlapped within a lever body, in a switching structure in which two or more knobs for turning on, turning on or off a headlight or a fog light, or adjusting a wiping interval of a windshield wiper are provided within a single lever, thereby simplifying a structure.

BACKGROUND ART

In general, in a vehicle, in order to turn on, or turn on or off a headlight or a fog light, when driving a vehicle, under environment in which visibility is not good, such as when driving at a night time or a foggy region, or to secure a range of sight of the front or the rear of a driver when it snows or rains while driving the vehicle, a plurality of switch levers for a vehicle for adjusting a wiping interval of a windshield wiper for wiping a front glass or a rear glass are provided.

The vehicle switch levers are commonly disposed around a steering handle for a driver's easy dealing, and by manipulating the switch lever in a vertical direction, a lateral direction, a front-rear direction, or by performing a front-reverse rotation, an operation of the corresponding device is appropriately induced.

As shown in FIG. 1, the vehicle switch lever includes (first and second) knobs 6 and 8 for performing a rotation manipulation in order to turn on, turn on or off a headlight or a fog light thereof, or adjust a wiping interval of a windshield wiper, a contact holder 100 for rotating together according to a rotation of the knobs 6 and 8, an insulation part 110 in which a printed circuit board (PCB) or a fixed terminal is provided to generate an operation signal by contacting with the contact holder 100, and a wire 120 that is connected to the insulation part 110 and that is an intermediate element for transferring an operation signal to a control unit (not shown) of the corresponding device while the contact holder 100 contacts with the PCB or the fixed terminal. In the drawings, reference numeral 10 is a lever holder, and reference numeral 12 is a coupling part.

In this case, a spring (not shown) for providing elasticity for an easy contact of the contact holder 100 and the insulation part 110 is provided at one side of the contact holder 100 and the insulation part 110.

In the vehicle switch lever, when a plurality of knobs for manipulating two or more lights such as a headlight and a fog light, or a multi-stage windshield wiper that can variously adjust an interval thereof are disposed within a single switch lever, a contact holder for rotating together with the each knob and an insulation part and a wire for generating the corresponding operation signal by manipulating the each knob and for transferring the signal should be provided.

Therefore, according to a structure of a conventional switch lever for a vehicle in which a plurality of knobs are disposed within a single switch lever, because each of a separate contact holder, an insulation part, and a wire corresponding to the each knob together with the each knob should be provided, the number of parts for composing the single switch lever increases and the number of assembly processes increases according to the increase of the number of parts and thus productivity is deteriorated and a production cost increases. When a failure occurs between a contact holder and an insulation part for generating an operation signal, an entire switch lever should be disassembled and assembled, whereby there is difficulty in a maintenance.

DISCLOSURE OF INVENTION

Technical Problem

The present invention has been made in an effort to solve the above problems, and the present invention provides a switch lever for a vehicle for directly transferring an operation signal from a fixed terminal to a control unit of the corresponding device through two or more lever arms disposed to be overlapped within a lever body without transferring an operation signal generated by performing a rotation manipulation of each knob through a separately drawn-out wire in a switching structure having two or more knobs within a single lever, thereby reducing the number of components, a switching structure can thus be simplified and thereby easily disassembling and assembling, a maintenance is thus easily performed.

Technical Solution

According to an aspect of the present invention, there is provided a switch lever for a vehicle that is installed in an extended form in a length direction at one side of a steering wheel to perform a manipulation in a vertical, lateral, front-rear direction, or to perform a forward or reverse rotation, thereby turning on, turning on or off a headlight or a fog light of the vehicle, or adjusting a wiping interval of a windshield wiper and including several manipulation levers to be mounted in the vehicle and used, preferably, including: a plurality of knobs that perform a rotation manipulation in order to turn on, turn on or off a headlight or a fog light of the vehicle, or to adjust a wiping interval of a windshield wiper of the vehicle; a pair of lever arms that are disposed within the knob to rotate together according to a rotation of the knobs; a pair of contact terminals each that is provided at an end part of one side of the lever arms to move according to a rotation of the lever arms; a guide member in which each of guide grooves for arriving and moving the contact terminals is formed; and an insulation part that contacts with each of the contact terminals to generate an operation signal.

Further, the lever arm may include: a first lever arm that forms a cylindrical body extended to a predetermined length, in which a coupling part for coupling one knob is formed at an end part of one side of the first lever arm, and in which a protruding part for coupling one contact terminal is formed at an end part of the other side thereof; and a second lever arm that forms a cylindrical body extended to a predetermined length that can house by penetrating the first lever arm to the inside thereof and in which a coupling part for coupling another knob is formed at an end part of one side of the second lever arm, and in which a protruding part for coupling the remaining contact terminal is formed at an end part of the other side thereof.

Here, it is preferable that the protruding part is formed in a spherical shape or a hemispherical shape.

Further, it is preferable that the protruding part is bent along a tilt line for forming a predetermined angle relative to a length direction of the lever arm from one end of the each lever arm.

Further, it is preferable that a ring-shaped arm holder for preventing interference due to a contact between the first lever arm and the second lever arm is mounted at an end part of the protruding part side of the first lever arm.

Further, it is preferable that a hollow lever holder is installed within a lever body having an external appearance for fixing the knob and a pair of lever arms penetrate the inside of the lever holder.

Further, it is preferable that a coupling part is bent along a tilt line for forming a predetermined angle relative to a length direction of the lever holder at the end part side of the lever holder adjacent to the protruding part of the lever arm.

Further, it is preferable that a fixed terminal is formed at an upper part of the insulation part.

BEST MODE FOR CARRYING OUT THE INVENTION

Hereinafter, exemplary embodiments of a switch lever for a vehicle according to the present invention will be described in detail with reference to the accompanying drawings. The embodiments of the present invention are intended only to exemplify the present invention, and thus the present invention is not limited to the embodiments.

Figure 1:
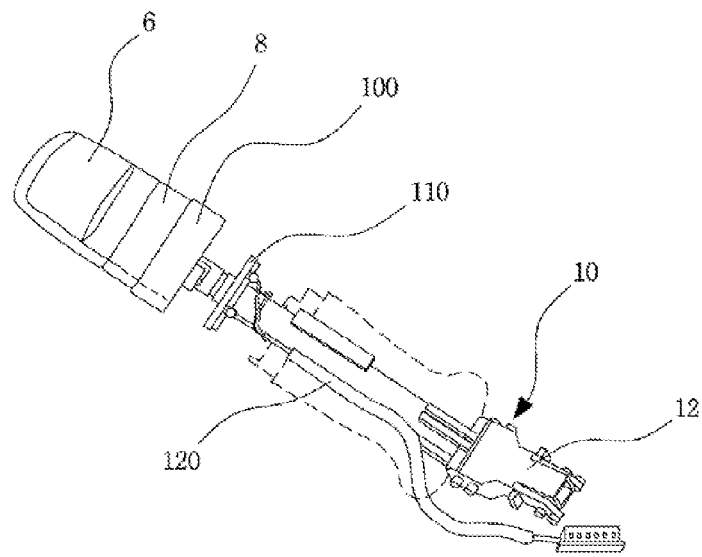
FIG. 1 is a perspective view illustrating a configuration of a switch lever for a vehicle in the prior art.
Figure 2:
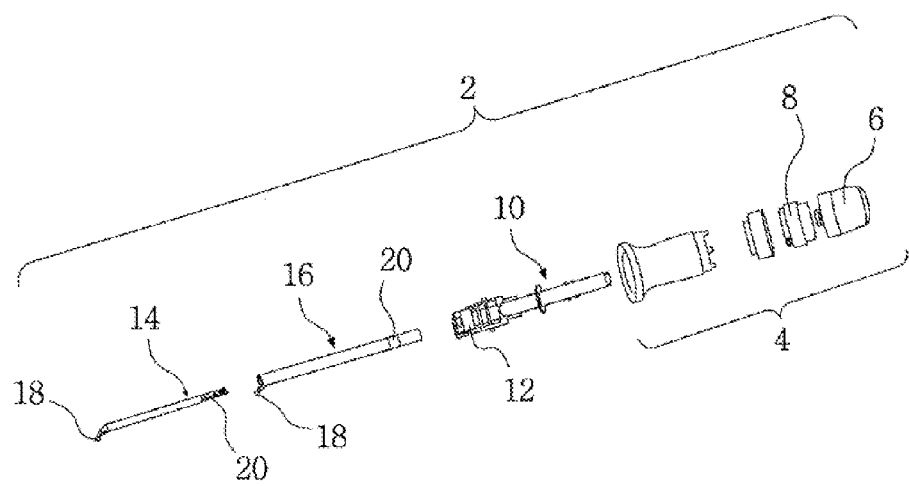
FIG. 2 is an exploded perspective view illustrating a structure of a lever unit in a switch lever for a vehicle according to the present invention.
Figure 3:
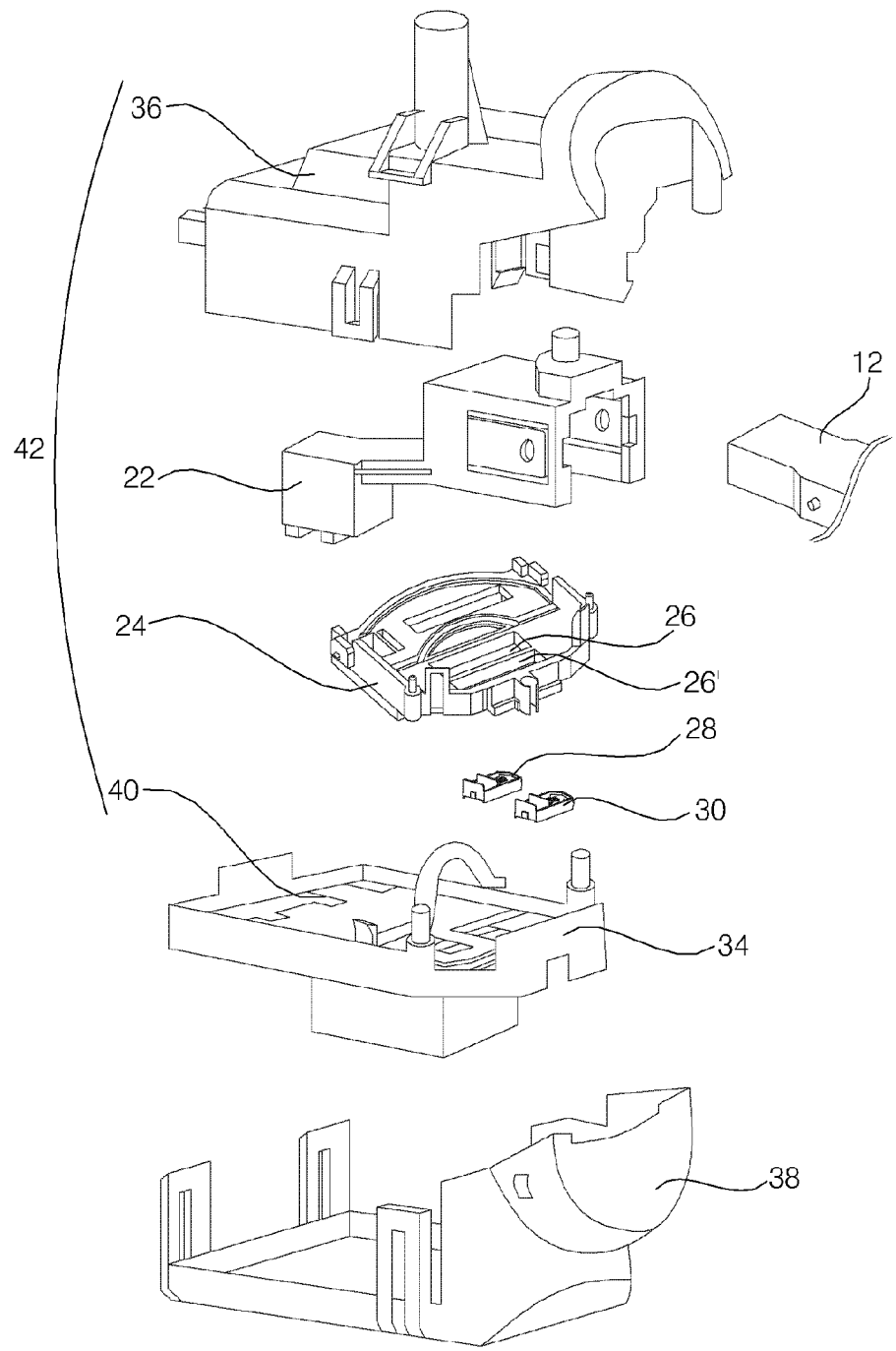
FIG. 3 is an exploded perspective view illustrating a structure of a body unit in a switch lever for a vehicle according to the present invention.
Figure 4:
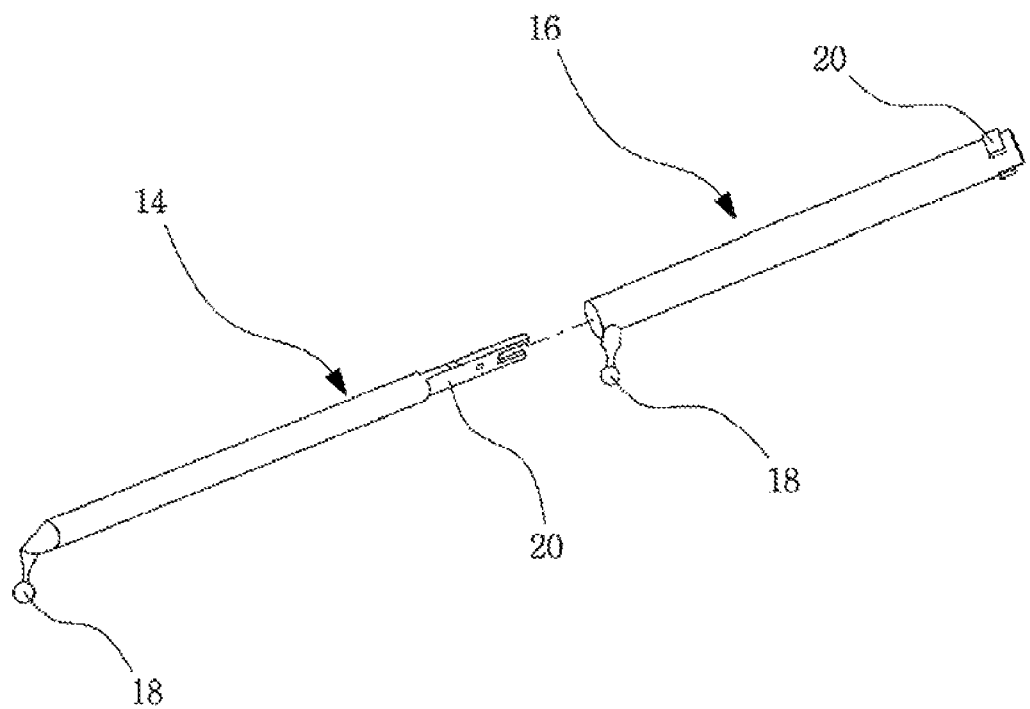
FIG. 4 is an exploded perspective view illustrating lever arms of a switch lever for a vehicle according to the present invention.
Figure 5:
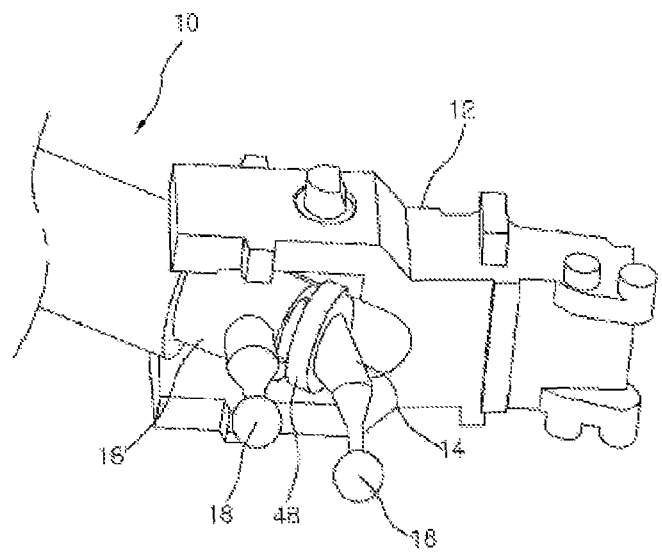
FIG. 5 is a partially-enlarged perspective view illustrating a connection state of lever arms and a lever holder of a switch lever for a vehicle according to the present invention.
Figure 6:
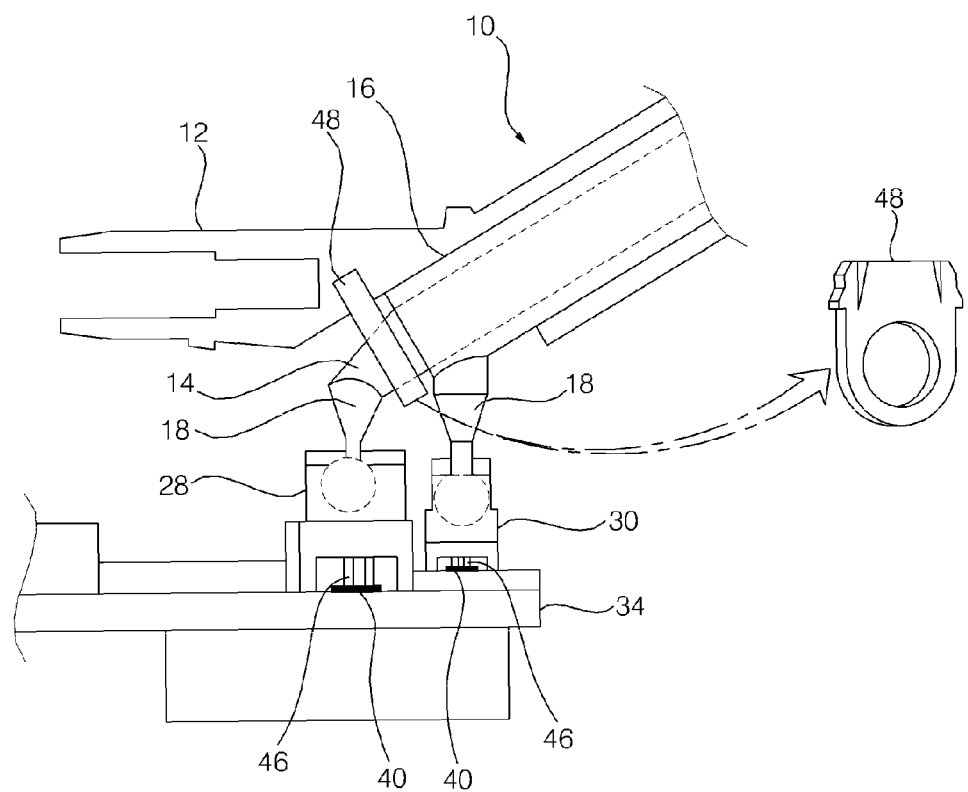
FIG. 6 is a schematic side view illustrating a state where a switch lever for a vehicle according to the present invention is connected to contact terminals, wherein a guide member is omitted from FIG. 6 to show the contact terminals better.
Figure 7:
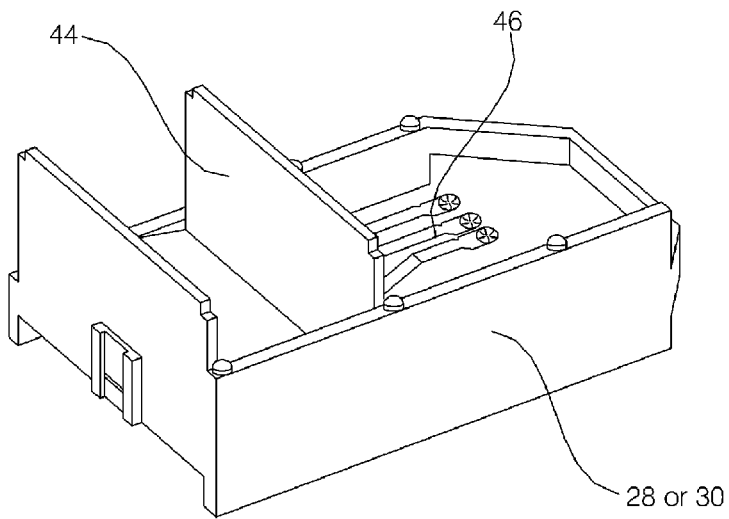
FIG. 7 is a perspective view illustrating contact terminals of a switch lever for a vehicle according to the present invention.
Figure 8:
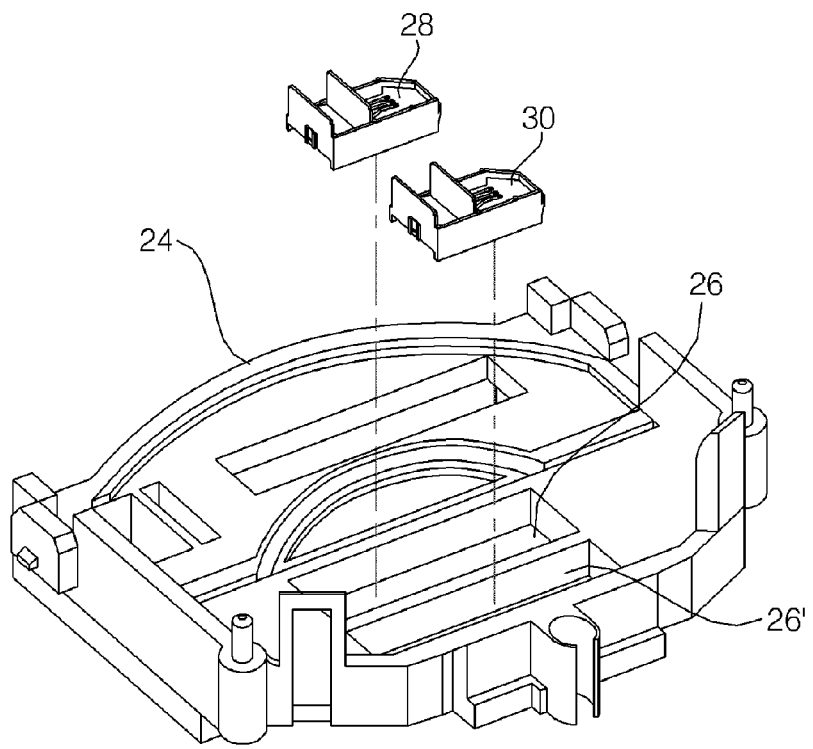
FIG. 8 is a perspective view illustrating a guide member of a switch lever for a vehicle according to the present invention.

FIG. 2 is an exploded perspective view illustrating a structure of a lever unit 2 in a switch lever for a vehicle according to the present invention, FIG. 3 is an exploded perspective view illustrating a structure of a body unit 42 in a switch lever for a vehicle according to the present invention, FIG. 4 is an exploded perspective view illustrating lever arms 14 and 16 of a switch lever for a vehicle according to the present invention, FIG. 5 is a partially-enlarged perspective view illustrating a connection state of lever arms 14 and 16 and a lever holder 10 of a switch lever for a vehicle according to the present invention, FIG. 6 is a schematic side view illustrating a state where a switch lever for a vehicle according to the present invention is connected to contact terminals 28 and 30, wherein a guide member 24 is omitted from FIG. 6 to show the contact terminals 28 and 20 better, FIG. 7 is a perspective view illustrating contact terminals 28 and 30 of a switch lever for a vehicle according to the present invention, and FIG. 8 is a perspective view illustrating a guide member 24 of a switch lever for a vehicle according to the present invention.

As shown in FIGS. 2 to 8, the switch lever for a vehicle according to the present invention includes a lever unit 2 for transferring an operation signal for a device, such as a headlight or a fog light, or a windshield wiper by a rotation manipulation, or a manipulation of a vertical direction, a lateral direction, and a front-rear direction, and a body unit 42 for generating an operation signal by a contact of a fixed terminal 40 and the contact terminals 29 and 30 according to an operation of the lever unit 2.

The lever unit 2 has symbols for allowing a driver to distinguish a function such as an operation signal and an operation method for turning on, turning on or off a headlight or a fog light of a vehicle, or for adjusting a wiping interval of a windshield wiper of the vehicle while forming an external appearance of a switch lever of the present invention at an outer circumference thereof.

As shown in FIG. 2, the lever unit 2 includes a lever body 4 that has two or more knobs 6 and 8 for allowing a driver to operate a device such as a headlight, a fog light, or a windshield wiper of the vehicle by performing a rotation manipulation, or performing a manipulation of a vertical direction, a lateral direction, and a front-rear direction along the symbol, a lever holder 10 that is disposed within the lever body 4 to allow coupling between the lever body 4 and the body unit 42, and two or more lever arms 14 and 16 for transferring an operation signal while moving together according to an operation of the knobs 6 and 8.

For easy description of the present invention, a description is limited to a vehicle switch lever in which two knobs 6 and 8 are provided; one is called a first knob 6, and the other one is called a second knob 8. That is, a knob for manipulating a headlight of the vehicle is called a first knob 6, and a knob for manipulating a fog light is called a second knob 8.

The first knob 6 and the second knob 8 are connected by a pair of lever arms 14 and 16, and an arm coupled to the first knob 6 is called a first lever arm 14, and an arm coupled to the second knob 8 is called a second lever arm 16.

Further, the first lever arm 14 and the second lever arm 16 according to the present invention are connected by a pair of contact terminals 28 and 30, a first contact terminal 28 is coupled to the first lever arm 14, and a second contact terminal 30 is coupled to the second lever arm 16.

As shown in FIG. 3, the body unit 42 according to the present invention includes a body housing 36 for forming an external appearance, a contact holder 22 that is provided at a lower end of a body housing 36 to be coupled to the lever holder 10 of the lever unit 2, first and second contact terminals 28 and 30 that are provided at a lower part of the contact holder 22 to be coupled to the first lever arm 14 and the second lever arm 16 of the lever unit 2, thereby moving together according to a rotation of the lever arms 14 and 16, a guide member 24 for arriving the contact terminals 28 and 30 and in which guide grooves 26 and 26' for guiding movement of the contact terminals 28 and 30 are formed, an insulation part 34 that is coupled to a lower part of the guide member 24 to contact with the contact terminals 28 and 30 and in which a fixed terminal 40 for generating an operation signal is provided, and a body base 38, which is a lower housing member that is provided at a lower part of the insulation part 34 to be assembled with a pair with the body housing 36.

The present invention is characterized by a configuration for generating an operation signal by manipulating two or more knobs 6 and 8 in order to control an operation of a headlight, a fog light, or a windshield wiper, and other configuration of the switch lever, except for the knobs 6 and 8, lever arms 14 and 16 interlocked with the knobs 6 and 8, contact terminals 28 and 30, a guide member 24, and an insulation part 34 is identical or similar to that of a conventional switch lever for a vehicle.

Specifically, a switch lever for a vehicle according to an exemplary embodiment of the present invention includes a first knob 6 and a second knob 8 for rotating in order to turn on several lights, or to adjust a wiping interval of a windshield wiper, a first lever arm 14 and a second lever arm 16 that are connected to one side of the inside of the first knob 6 and the second knob 8, respectively, to rotate together according to a rotation of the each knob 6 and 8, a first contact terminal 28 and a second contact terminal 30 that are connected to an end part of one side of the first lever arm 14 and the second lever arm 16, respectively, to move according to a rotation of the first lever arm 14 and the second lever arm 16, a guide member 24 in which each of two guide grooves 26 and 26' for arriving and moving the first contact terminal 28 and the second contact terminal 30 is formed, and an insulation part 34 for contacting with the first contact terminal 28 and the second contact terminal 30 that are coupled to a lower end of the first contact terminal 28 and the second contact terminal 30 to move and for generating an operation signal.

As shown in FIG. 4, the first lever arm 14 forms a cylindrical body extended to a predetermined length, a fastening part 20 for coupling the first knob 6 is formed at an end part of one side of the first lever arm 14, and a protruding part 18 of a spherical shape or a hemispherical shape for coupling the first contact terminal 28 is formed at an end part of the other side thereof, the second lever arm 16 forms a cylindrical body extended to a predetermined length that can house by penetrating the first lever arm 14 into the inside of the second lever arm 16, a fastening part 20 for coupling the second knob 8 is formed at an end part of the one side thereof, and a protruding part 18 of a spherical shape or a hemispherical shape for coupling the second contact terminal 30 is formed at an end part of the other side thereof.

The first lever arm 14 is penetrated to and inserted into a hollow part of the second lever arm 16. If the number of knobs is three or more, lever arms of the number corresponding to the number of the knobs are provided, a cylindrical lever arm is disposed at the innermost thereof, and the first lever arm 14 can be disposed by sequentially inserting according to a size of an inner diameter thereof so that the remaining cylindrical lever arms having different inner diameters other than the cylindrical lever arm are concentrically overlapped at an outer side of the cylindrical lever arm.

As the protruding part 18 of the first lever arm 14 and the second lever arm 16 according to the present invention are bent along a tilt line that forms a predetermined angle, i.e., an angle between 20° to 80° relative to a length direction of the lever arms 14 and 16 from one end of each of the lever arms 14 and 16, the protruding part 18 can be operated with a wide rotation radius only by a slight rotation of the lever arms 14 and 16.

As shown in FIGS. 2, 5, and 6, the lever holder 10 is a cylindrical body that is inserted into the lever body 4 for forming an external appearance for fixing the knobs 6 and 8, a pair of lever arms 14 and 16 are installed to penetrate the inside of the lever holder 10, and a coupling part 12 is bent along a tilt line for forming a predetermined angle relative to a length direction of the lever holder 10 at an end part side of the lever holder 10 adjacent to the protruding part 18 of the lever arms 14 and 16.

The coupling part of the lever holder 10 is coupled in a hinge type to a contact holder 22 of the body unit 42 and performs a function as a connection part that can transfer an operation signal requested by a driver toward a controller according to a manipulation (e.g. a vertical manipulation of the lever unit 2) of the lever unit 2 of a vehicle driver.

Further, when the first lever arm 14 is disposed to penetrate the inside of the second lever arm 16, in order to prevent interference due to a mutual contact of the first lever arm 14 and the second lever arm 16, an arm holder 48 may be further mounted at an end part toward the protruding part 18 of the first lever arm 14, as shown in FIGS. 5 and 6.

The arm holder 48 is a plate-shaped ring having a hole for penetrating the first lever arm 14 and is a member for independently operating the first lever arm 14 and the second lever arm 16, and it is more preferable that one side of the arm holder 48 is fixed within the coupling part 12 of the lever holder 10.

As shown in FIG. 7, the first contact terminal 28 and the second contact terminal 30 are coupled to each protruding part 18 of the first lever 14 and the second lever 16, are a member for generating an operation signal by contacting with a fixed terminal 40 of the insulation part 34 while moving together with a rotation of the first lever arm 14 and the second lever arm 16, a contact terminal groove 44 for inserting the each protruding part 18 of a pair of lever arms 14 and 16 is formed, and a metal terminal 46 for contacting with the fixed terminal 40 of the insulation part 34 is formed at a lower end side of the contact terminal groove 44.

The first contact terminal 28 and the second contact terminal 30 arrive within the guide grooves 26 and 26' formed in the guide member 24 that is shown in FIGS. 3 and 8 to perform a linear motion, and in this case, the guide grooves 26 and 26' may be formed in a structure corresponding to a position and a form of the fixed terminal 40 provided within the insulation part 34 contacting with the contact terminals 28 and 30.

Further, as the insulation part 34 has a fixed terminal 40 of a metal material at an upper end thereof, the contact terminals 28 and 30 and the fixed terminal 40 of the insulation part 34 moving along the lever arms 14 and 16 contact with each other, and within the insulation part 34, terminals that can generate other operation signals when the vehicle driver manipulates the lever unit 2 may be further provided in addition to the fixed terminal 40 contacting with the contact terminals 28 and 30.

An operation of a switch lever for a vehicle according to the present invention having such a structure is described as follows.

First, in order to turn on, turn on or off a headlight or a fog light of a vehicle, or to adjust a wiping interval of a windshield wiper of the vehicle, if the vehicle driver rotates the first knob 6 or the second knob 8, the first lever arm 14 or the second lever arm 16 connected to one side of the first knob 6 or the second knob 8, respectively, rotates together with a rotation of the first knob 6 or the second knob 8.

As the first lever arm 14 or the second lever arm 16 rotates, the protruding part 18 provided at an end part of one side thereof rotates together, and the first contact terminal 28 or the second contact terminal 30 connected to the protruding part 18 moves along the guide grooves 26 and 26' of the guide member 24.

In this case, as the first contact terminal 28 or the second contact terminal 30 contacts with the fixed terminal 40 of the insulation part 34 provided at a lower part thereof, the first contact terminal 28 or the second contact terminal 30 generates an operation signal requested by a driver, thereby turning on, turning on or off a headlight or a fog light, or adjusting a wiping interval of a windshield wiper.

Industrial Applicability

As described above, according to a switch lever for a vehicle of the present invention, a plurality of lever arms rotating together with a plurality of knobs are disposed to be overlapped within a single lever body, and by allowing the each lever arm to contact with an insulation part in which a fixed terminal is provided, an operation signal occurs and thus the number of parts of the switch lever can be remarkably reduced.

Further, in the present invention, by changing a contact point position of the switch lever using a plurality of lever arms disposed to be overlapped within the single lever body, disassembly and assembly can be very easily performed and thus productivity can be improved and a production cost of a product can be lowered. By simplifying a contact structure of a contact terminal and a fixed terminal of the insulation part, a contact failure problem between terminals of an existing structure can be solved.

It should be understood that the present invention can be executed in a detailed form different from an exemplary embodiment illustrated in the invention without changing the spirit and scope of the invention by those skilled in the art. Therefore, it should be understood that the above-described embodiment is not to limit the present invention but to illustrate it. Therefore, the scope of the present invention is represented by the following claims rather than the detailed description, and various changes and modifications derived from the spirit and scope of the claims and an equivalent concept thereof are also included in the scope of the invention.

The invention claimed is:

1. A switch lever for vehicle, comprising:
   a hollow first lever arm connected to and rotatable by a first knob, the first lever arm having a first protrusion extended and tilted from an end of the first lever arm;
   a second lever arm, coaxially aligned within the first lever arm, connected to and rotatable by a second knob, the second lever arm having a second protrusion extended and tilted from an end of the second lever arm;
   a guide member having first and second guide grooves; a first contact terminal connected to the first protrusion and positioned in the first guide groove, wherein the first contact terminal is movable along the first guide groove when the first knob rotates;
   a second contact terminal connected to the second protrusion and positioned in the second guide groove, wherein the second contact terminal is movable along the second guide groove when the second knob rotates; and
   a single insulation part having a fixed terminal thereon, the fixed terminal being capable of contacting with at least one of the first and second contact terminals to generate an electric signal when said at least one of the first and second contact terminals moves.

2. A switch lever for a vehicle comprising:
   a plurality of knobs that perform a rotation manipulation in order to turn on, or turn on or off a headlight or a fog light of a vehicle, or to adjust a wiping interval of a windshield wiper of the vehicle;
   a pair of lever arms that are disposed within and rotate with the knobs according to a rotation of the knobs;
   a pair of contact terminals each that is installed at an end part of one side of the lever arms to move according to a rotation of the lever arms;
   a guide member having guide grooves, wherein each contact terminal is positioned in each guide groove and linearly moves along each guide groove: according to the rotation of the lever arms; and
   a single insulation part having a fixed terminal disposed thereon, wherein the fixed terminal contacts with each of the contact terminals to generate an operation signal when each contact terminal linearly moves along each guide groove; wherein
   the pair of lever arms comprise a hollow first lever arm and a second lever arm which is coaxially aligned within the first lever arm.

3. The switch lever for a vehicle of claim 2, wherein the fixed terminal is formed at an upper part of the single insulation part.

4. The switch lever for a vehicle of claim 1, wherein a hollow lever holder is installed within a lever body, and the pair of lever arms penetrate the inside of the lever holder, wherein the knobs are fixed to the lever body.

5. The switch lever for a vehicle of claim 4, wherein a coupling part is bent along a tilt line for forming a predetermined angle relative to a length direction of the lever holder at the end part side of the lever holder adjacent to the protruding part of the lever arm.

6. The switch lever for a vehicle of claim 1, wherein the pair of lever arms further comprises:
   the first lever arm forms a cylindrical body extended to a predetermined length, in which a coupling part for coupling one knob is formed at an end part of one side of the first lever arm, and in which a protruding part for coupling one contact terminal is formed at an end part of the other side thereof; and
   the second lever arm forms a cylindrical body extended to a predetermined length that can house by penetrating the first lever arm to the inside thereof and in which a coupling part for coupling another knob is formed at an end part of one side of the second lever arm, and in which a protruding part for coupling the remaining contact terminal is formed at an end part of the other side thereof.

7. The switch lever for a vehicle of claim 6, wherein the protruding part is formed in a spherical shape or a hemispherical shape.

8. The switch lever for a vehicle of claim 6, wherein the protruding part is bent along a tilt line for forming a predetermined angle relative to a length direction of the lever arm from one end of the each lever arm.

9. The switch lever for a vehicle of claim 6, wherein a ring-shaped arm holder for preventing interference due to a contact between the first lever arm and the second lever arm is mounted at an end part of the protruding part side of the first lever arm.

* * * * *